United States Patent [19]

Perper

[11] 4,127,797

[45] Nov. 28, 1978

[54] INVERTER OSCILLATOR WITH CURRENT FEEDBACK

[75] Inventor: Lloyd J. Perper, Tucson, Ariz.

[73] Assignee: Iota Engineering, Inc., Tucson, Ariz.

[21] Appl. No.: 824,440

[22] Filed: Sep. 19, 1977

Related U.S. Application Data

[63] Continuation-in-part of Ser. No. 784,071, Apr. 4, 1977, which is a continuation of Ser. No. 646,240, Jun. 2, 1976, abandoned.

[51] Int. Cl.$^2$ .................. H05B 39/02; H05B 39/04; H05B 41/36
[52] U.S. Cl. .................. 315/209 R; 315/DIG. 5; 315/DIG. 7; 315/101; 315/105; 315/206
[58] Field of Search ............ 331/113 A; 315/DIG. 2, 315/DIG. 5, DIG. 7, 276, 101, 105, 106, 107, 279, 206, 209

[56] References Cited

U.S. PATENT DOCUMENTS

| | | | |
|---|---|---|---|
| 3,501,674 | 3/1970 | Moore | 315/105 |
| 3,882,354 | 5/1975 | May | 315/101 |

*Primary Examiner*—Saxfield Chatmon, Jr.
*Attorney, Agent, or Firm*—Harris, Kern, Wallen & Tinsley

[57] ABSTRACT

A power source for operating gas discharge lamps and other loads at high frequency, typically utilizing a 120 volt ac source rectified to provide a 150 volt dc input and providing a 20,000 hertz output. An inverter with current feedback in place of the conventional voltage feedback providing voltage turn off and voltage turn on in less time and providing increased base current during the conduction time for reducing the voltage-current product and heat generated in the inverter. Voltage limiting and current limiting features are provided for the basic circuit. Inverter circuits with two transistors for increased loads are also provided.

15 Claims, 10 Drawing Figures

PRIOR ART
VOLTAGE FEEDBACK

CURRENT FEEDBACK

INVERTER OSCILLATOR WITH CURRENT FEEDBACK

CROSS-REFERENCES TO RELATED APPLICATION

This application is a continuation-in-part of copending application Ser. No. 784,071, filed Apr. 4, 1977, which was a continuation of copending application Ser. No. 646,240, filed June 2, 1976, now abandoned.

BACKGROUND OF THE INVENTION

This invention relates to a power source for gas discharge lamps and other loads operated at high frequency, and in particular is directed to a new and improved power source suitable for energizing fluorescent lamps with improved efficiency and reduced heating.

The basic design for a power source utilizing a swinging choke inverter is shown in U.S. patent to Campbell U.S. Pat. No. 3,396,307. Variations on this basic circuit are shown in U.S. patent to Pierce U.S. Pat. No. 3,889,153 and copending applications of Perper Ser. No. 596,069 filed July 15, 1975, now U.S. Pat. No. 4,005,335, and Ser. No. 611,897 filed Sept. 10, 1975, now U.S. Pat. No. 4,017,785, and assigned to the same assignee as the present application. It should be noted that the circuitry of Campbell, Pierce, and Perper is primarily representative of voltage feedback in that a voltage from the output transformer is derived in a secondary winding, processed, and supplied to the transistor base. Similarly, the circuitry of U.S. Pat. Nos. 3,501,674 (Moore) and 3,882,354 (May) is primarily representative of voltage feedback, since a voltage from the output transformer is also used.

In a power oscillator, the quantity fed around is likely to contain components representative of both voltage and current, so that the concepts of voltage and current feedback are inexact. Nevertheless if the feedback is primarily of one type or the other, the nomenclature is reasonable and essentially valid.

In the circuitry hereinafter disclosed, use is made of the fact that the oscillator current comprises a steeper and more suitable switching signal than collector voltage. The feedback voltage is primarily representative of such current. To qualify as such, the feedback winding must produce a voltage drop representative of the current flowing through a small resistance in series with the transistor or the load. A separate transformer for feedback permits current feedback; the use of a secondary from the transistor output transformer, as in Moore or May, inherently produces voltage feedback, and distinguishes from current feedback as herein disclosed.

The distinction between voltage and current feedback as herein used, is apparent, as seen on an oscilloscope, in the wave shapes produced. In both cases, the primary of the output transformer may be considered to function as a swinging choke. The swinging choke inverter uses a power transistor operated as a switch for switching current through the primary of a transformer. However the transistor is not a perfect switch and there are power losses in the switching operation resulting in undesired heating and reduction in efficiency. There is current flow during the time of voltage turn on and turn off, and the energy dissipated produces heat. Also, an appreciable voltage-current product exists during the conduction interval (the on time) of the transistor due to the saturation voltage not being minimized.

Accordingly, it is an object of the present invention to provide a new and improved power source which reduces the energy losses during the turn on, turn off and conduction intervals, with a resultant reduction in heat loss and improvement in efficiency. It is a specific object of the invention to provide an improved circuit utilizing current feedback in place of the conventional voltage feedback and to increase the base current during the conduction interval while shortening the turn on and turn off times. An additional object is to provide such a power source incorporating voltage limiting and current limiting features, and one which may utilize more than one power transistor for increased load handling.

SUMMARY OF THE INVENTION

The power source of the present invention utilizes an inverter with oscillator circuit and transformer. A current feedback circuit is provided to the transistor base in place of the conventional voltage feedback circuit. In one embodiment, the primary winding of the main transformer is connected in series with the collector and emitter of the power transistor and a winding of another transformer across the dc input terminals. Another winding of the second transformer provides the current feedback to the base of the transistor. In alternative embodiments, a second transistor may be used to load the second transformer, with a feedback winding on the first transformer providing a control voltage for the second transistor base for voltage limiting, and with a winding on the second transformer providing a control voltage for the base for current limiting. In other embodiments, two power transistors are operated in parallel with current feedback and with a combination of voltage and current feedback. In a further embodiment, the current feedback transformer is located with its primary winding in the load current path, and its secondary winding in the transistor base circuit. In the absence of a load, no load current can flow; feedback then ceases and the oscillation vanishes except for keep-alive signals which maintain operation at a low level.

DESCRIPTION OF THE PREFERRED EMBODIMENTS

Figure 1:
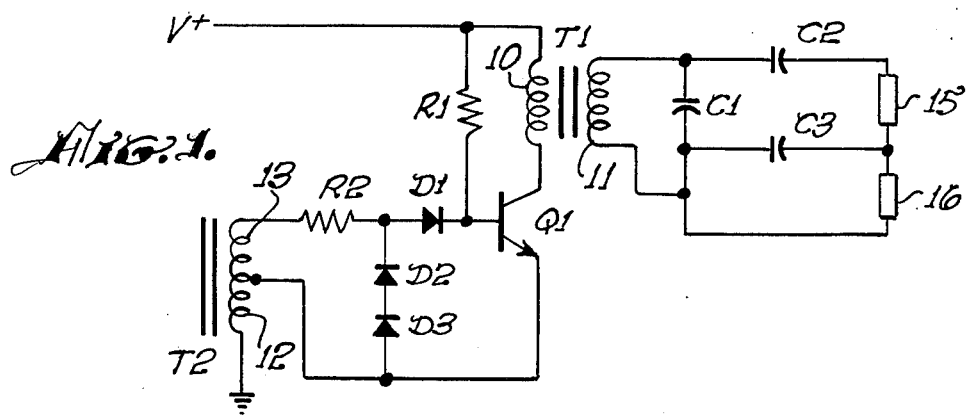
FIG. 1 is an electrical diagram of an inverter type power source incorporating one embodiment of the invention.

The circuit of FIG. 1 utilizes a first transformer T1 and a second transformer T2. The transformer T1 has a primary winding 10 and a secondary winding 11. The transformer T2, typically an auto transformer, has a first winding 12 and a second winding 13. The secondary winding 11 may be connected across fluorescent lamps 15, 16 in the conventional manner using capacitors C1, C2 and C3. The primary winding 10 is connected in series with the collector and emitter electrodes of transistor Q1 and the first winding 12 across the dc supply. The second winding 13 is connected in the feedback circuit to the transistor base via resistor R2 and diode D1, with diodes D2 and D3 connected across the winding 13.

In operation, the emitter current of the transistor Q1 flows through the winding 12. This induces a voltage in the winding 13 which forward biases the diode D1 and reverse biases the diodes D2 and D3. The induced voltage produces a current flow to the junction between the windings 12 and 13 via the series circuit of R2, D1, and the base-emitter circuit of transistor Q1. When Q1 switches, the back EMF of winding 13 produces a current flow through D3, D2, and winding 13. A low impedance is reflected into the winding 12, the current of which generates the base-emitter current in the transistor Q1.

The resistor R1 serves as a starter resistor, raising the base voltage of the transistor to the level required for oscillator ignition. The resistor R2 is in the range of 0 to 1 ohm; R2 limits the base current to preclude runaway condition, causes the reflected impedance in the winding 12 to be more resistive, and causes the base current of the transistor to resemble the collector current more closely than when the resistor R2 is omitted.

Figure 2A:
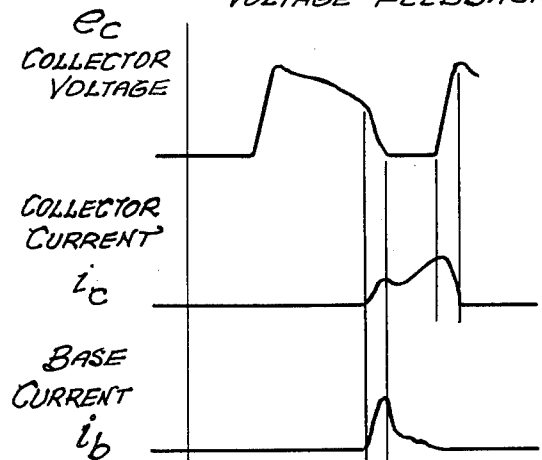
FIGS. 2a and 2b are voltage and current diagrams illustrating the operation of the prior art voltage feedback circuitry and the current feedback circuitry of the present invention, respectively.
Figure 2B:
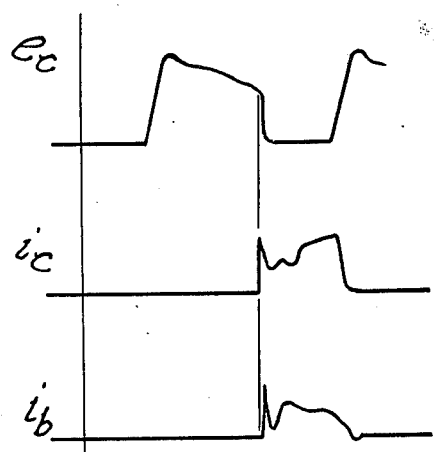

The circuit of FIG. 1 increases the base current during the conduction interval in comparison with the conventional voltage feedback circuit, and shortens the transistor turn on and turn off times in comparison with the conventional voltage feedback circuit. The collector voltage, collector current and base current for the comparable prior art voltage feedback circuit and the current feedback circuit of the present invention are shown in FIGS. 2a and 2b, respectively. As FIG. 2b indicates, the collector current in the current feedback circuit of the invention exhibits steep leading and trailing edges. Also, the base current is maintained throughout most of the conduction interval causing a reduced saturation voltage. The base current does not exactly follow the collector current throughout the conduction interval because the base loading varies over the current cycle. However, a considerable reduction in power waste is obtained with the current feedback circuit. By way of example, measurements were made of temperature rise at the transistor cases in a conventional voltage feedback circuit and the current feedback circuit of the present invention, with both circuits driving the same type lamps and providing equivalent light outputs. Operating in the same environment, the temperature of the case in the voltage feedback circuit was 60° C., while the temperature of the case in the current feedback circuit was 45° C.

Figure 7:
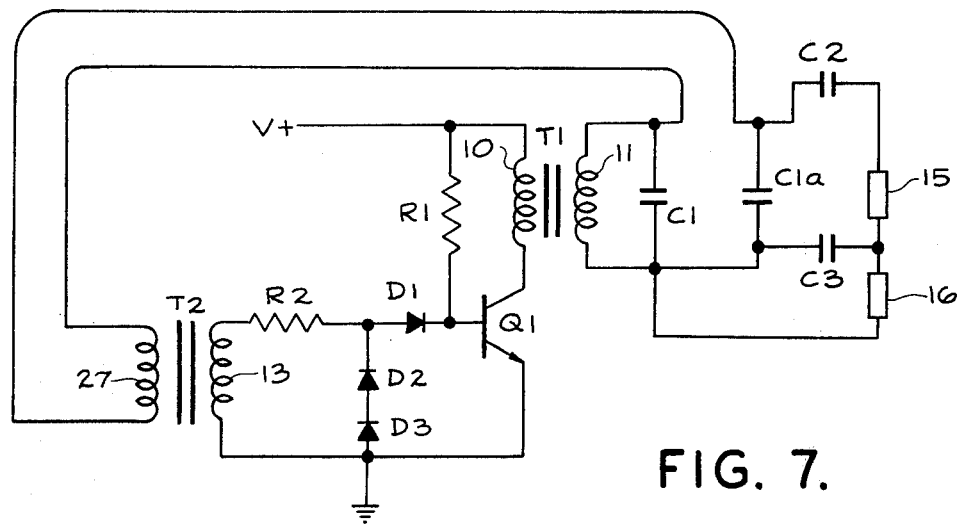
FIG. 7 is an electrical diagram of another embodiment of the invention utilizing feedback from the load side of the oscillator transformer.

An alternative embodiment providing feedback from the secondary or load side of the oscillator transformer T1 is shown in FIG. 7. Primary winding 27 of transformer T2 is connected in series with the lamps 15, 16, with additional capacitor C1a.

The advantage exists in the circuit of FIG. 7 that open circuit protection is inherently provided. In the absence of lamp loads 15 and 16, no current flows in primary 27 of transformer T2 (which is used in this embodiment as an isolating transformer rather than an auto transformer), other than the relatively small current through C1a, whose value is sufficiently large to keep oscillations alive at a low level in the absence of lamp ignition. When the lamps ignite, the shape of the current in primary 27 of transformer T2 resembles that in primary 12 of FIG. 1, and oscillations are similar to those obtained therein, provided that the turns ratio of T2 is adjusted to compensate for the modified primary impedance level (more T2 primary turns to compensate for less current in the secondary of T1 than in the primary of T1.) Typically, C1a is small compared with C1 (200 pf or less if C1 is 2,000 pf).

The operation of current-feedback in the invention is most easily distinguishable in the circuitry of FIG. 7. Therein the primary of transformer T2 is in series with the load; the voltage across this primary is representative of load current rather than voltage, and its rms value is a small fraction of the rms load voltage; the secondary of this transformer drives the oscillator base circuitry, subject to limiting by diodes D1, D2, D3 and the base to emitter diode action of transistor Q1. In the absence of a load, no current (except for keep-alive components) flow through the primary of the feedback transformer T2, and oscillation substantially vanishes. Accordingly, no separate open-circuit protection feature is needed.

By way of comparison, in FIG. 1, the output voltage rises during open-circuit conditions, tending to overload or blow out the transistor. To protect against open-circuit conditions, the controlled voltage feedback circuitry of Perper U.S. Pat. No. 4,055,335 was devised.

Figure 3:
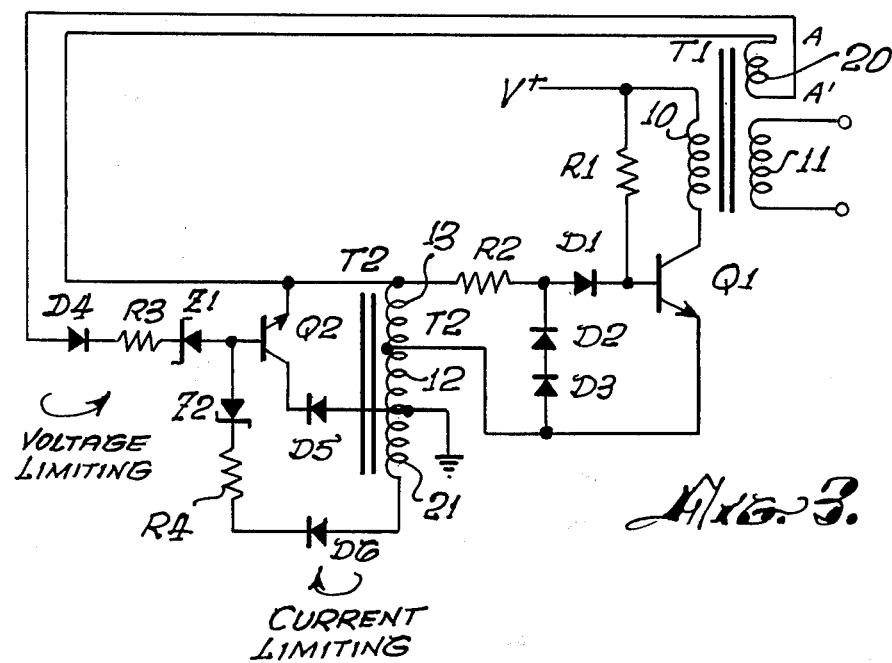
FIG. 3 is an electrical diagram illustrating an alternative embodiment of the invention with voltage and current limiting.

Another type of open-circuit protection, with current feedback, is shown in FIG. 3.

A transistor Q2 is connected across the windings 12, 13 of transformer T2. An additional feedback winding 20 is provided on the transformer T1 and is connected across the base and emitter of transistor Q2 through diode D4, resistor R3, and zener diode Z1.

Current feedback is generated in transformer T2. Since the fed-back quantity is representative of current in the transistor rather than in the load, there is no inherent mechanism for a disconnected load to result in turn-off or limiting of the oscillations. To effect this, voltage across the output transformer is sensed, and caused to load the feedback transformer when it increases excessively during open circuit conditions.

In operation, when the base of the control transistor Q2 draws current, its emitter-collector impedance loads the inductance of transformer T2, reducing the amount of feedback to the transistor Q1 and thereby reducing the oscillator current to near-zero value. That is, when the voltage at winding 20 goes up as a result of an open circuit to the load, the oscillator is shut off. The feedback winding 20 is small, typically comprising two turns when the primary winding 10 is 25 turns and the secondary winding 11 is 100 turns. The feedback winding produces a scaled replica of the collector voltage of transistor Q1. The feedback winding output is rectified by diode D4 and when this rectified output exceeds the voltage drop of the series zener diode Z1, current flows in the control transistor Q2, reducing the oscillator current. The open circuit collector voltage is reduced at the same time, beginning at a level of oscillator output as determined by the voltage drop of the diode Z1.

Current limiting may also be achieved for the purpose of removing current peaks which could damage the transistor Q1, and for the purpose of shaping the oscillator current for purposes of efficiency. A third winding 21 is provided on the transformer T2 to produce voltage feedback through diode D6, resistor R4 and zener diode Z2, current flows in the transistor Q2 and the oscillator current is reduced. The series diode D5 is used to prevent reverse voltage loading by the capacitive reactance or avalanche conduction of the transistor Q2.

In the circuit of FIG. 7, instead of using capacitor C1a as a means for keeping the oscillations of Q1 alive during removal of the load, it is possible to use a small amount of current feedback from the emitter circuit of Q1, or voltage feedback from a winding on transformer T1. The level of oscillation would be kept low under open-circuit conditions so as to consume little power. The secondary winding of the transformer in either case could be connected in series with the secondary of transformer T2 in FIG. 7.

Figure 8:
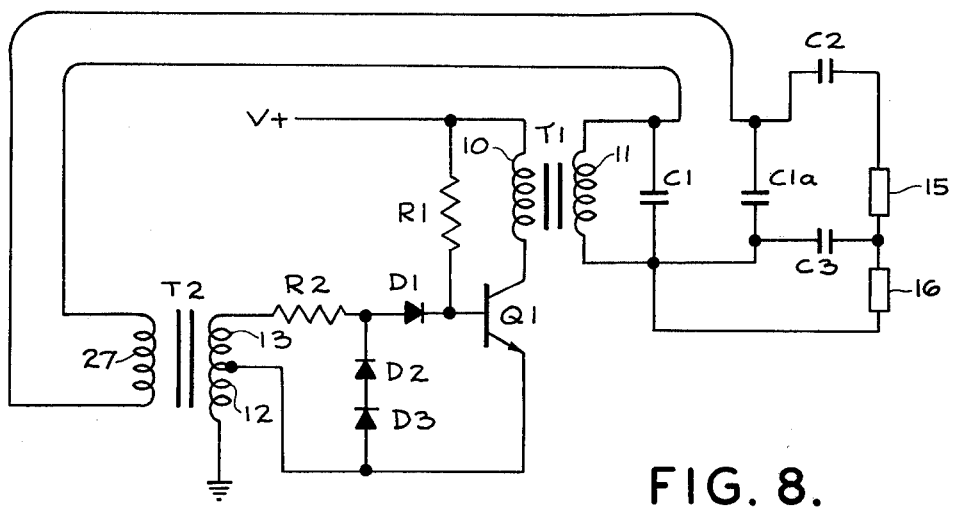
FIG. 8 is an electrical diagram of another embodiment of the invention combining features of the circuits of FIG. 1 and FIG. 7.

Another alternative embodiment is illustrated in FIG. 8 where feedback is provided from both the primary and the secondary sides of the oscillator trnasformer T1. The components in FIG. 8 correspond to the components in FIGS. 1 and 7 and the operation of the circuit is the same as described previously.

Figure 9:
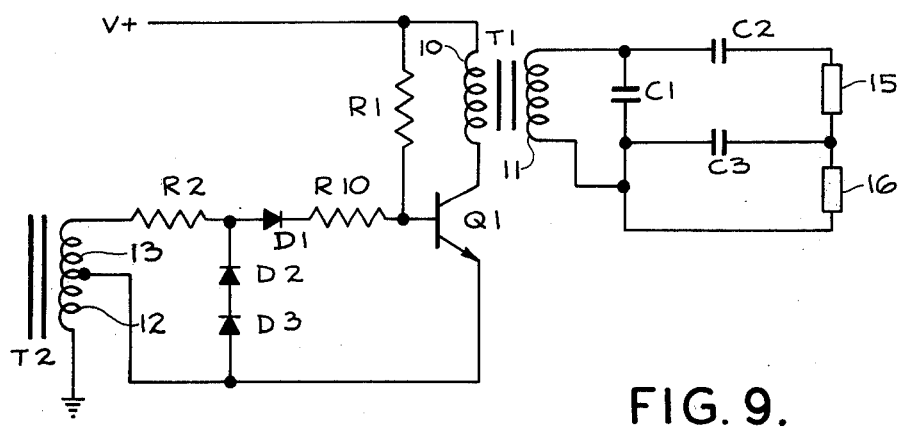
FIG. 9 is an electrical diagram of another embodiment of the invention illustrating different positioning of components.

In FIGS. 1, 3, 4, 5, 7 and 8, the resistor R2 is shown between the diode D1 and the winding 13. Alternatively, the resistor may be positioned between the diode D1 and the base of transistor Q1; shown as R10 in FIG. 9. Both resistors R2 and R10 may be utilized, or either may be utilized. Also as an alternative, the starter resistor R1 may be connected to the junction of diode D1 and resistor R10 as well as directly connected to the base of transistor Q1.

While two diodes D2 and D3 are shown in the circuit diagrams, a single diode or more than two diodes may be utilized here as desired. The diodes D2, D3 preferrably are selected to provide about the same voltage drop for the circuit in the positive and negative directions for substantially balancing the on and off times for the transistor Q1.

Figure 4:
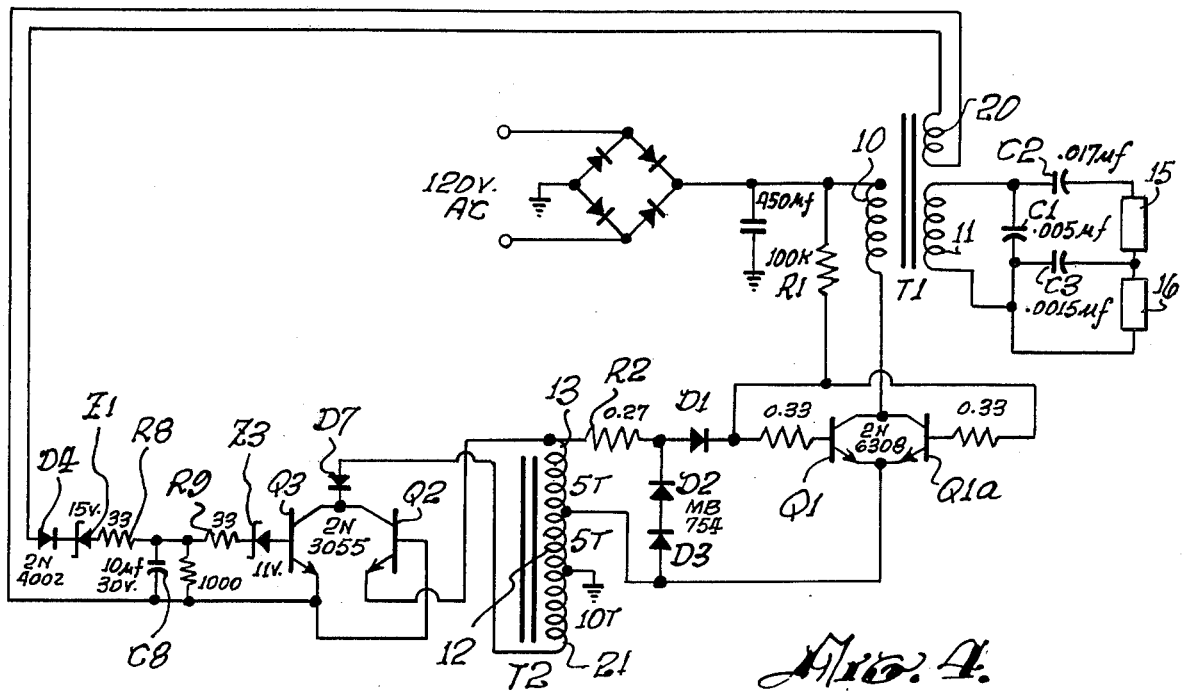
FIG. 4 is an electrical diagram of a power source illustrating another and presently preferred embodiment of the invention.

A presently preferred embodiment of the invention for driving two F96T12HO lamps is shown in FIG. 4. Two power transistors Q1, Q1a are utilized, and voltage limiting is achieved with control transistor Q2 and another control transistor Q3. In alternate configurations, transistor Q1a may be connected in parallel with transistor Q1 or may be omitted.

In the operation of this type of circuitry, several conditions should be met. The open circuit voltage of the power transistors should not exceed the absolute peak limit, such as 450 volts. The ignition threshold voltage at the power transistors must be exceeded during turn on, such as 350 volts. The current drawn during open circuit operation must not be outside the transistor safe operating limits for forward base bias, that is, there should be substantially zero current during voltage peaks. The open circuit protection effect should not be functioning during normal closed circuit operation. There should be a reversible transition between uncontrolled and controlled operation when the line voltage is increased or decreased or when the load is connected or removed.

All of these are achieved with the circuit of FIG. 4. The rectified and offset output of the feedback winding 20 is filtered by resistor R8 and capacitor C8 and is further offset by zener diode Z3. This voltage is applied to the transistor Q3 which is used to switch the diode action of the transistor Q2 which functions as a unipolar load across transformer T2. The voltage limiting circuitry of FIG. 4 is preferred to that of FIG. 3 as being more reliable and conservative and non-critical as regards circuit parameters. The distinction whereby the circuitry recognizes an open circuit condition in the increase of the rectified control voltage peaks at D4 from about 12 volts to the order of 30 volts. The zener diodes Z1, Z3 and the filter R8, C8 provide double isolation for the purpose of inhibiting oscillations through the feedback winding control path during transition to ignited operation. When ignition momentarily occurs, the peak collector voltage drops, removing the current through the zener diode Z1. The voltage across the capacitor C8 decays to 0 and transistors Q3 and Q2 turn off. It if is desired to avoid an electrolytic capacitor, a series inductance can be substituted for the parallel capacitance C8.

In the operation of the circuit of FIG. 4, the Q1 and Q1a base voltages rise as a result of current through the resistor R1 to a level that causes collector current to flow, and oscillation to commence. Emitter current flowing to ground through the transformer T2 generates a positive feedback voltage between collector and base which is approximately proportional to emitter current. This voltage is loaded on the negative swing by the two diodes D2, D3 in series, and on the positive swing by series circuitry including diode D1 and current-limiting resistance R2, and the base-to-emitter diode loading of the oscillator transistors Q1, Q1a. Without the resistance R2, the oscillator current may increase and run away with time.

As soon as collector current flows (FIG. 2b), current feedback through the base circuit builds up with a rapid rise to a peak, falling off as the conduction interval progresses. Collector current also peaks, falls off, and then typically builds to a second peak at which the current gradient in T1 reverses; cutoff occurs, completing the conduction cycle. The amplitudes and shapes of the current curves are adjustable by changing parameters, particularly of T2. They are preferably selected to provide large base current when the collector current peaks, so as to lower the transistor series impedance and cause it to act more nearly as an ideal switch.

The operation of the open-circuit protection elements in FIG. 4 is such as to load T2 with a control element, transistor Q2, in series with a diode D7 which passes current only during the reverse drive cycle, when the power transistor base drive is off during which time the collector voltage goes high.

When the load is open circuited, the voltage at the feedback winding 20 has higher peaks than in closed-circuit operation. These pass through diode D4, 15 volt zener diode Z1, and series resistor R8 to a R-C smoothing filter, the dc output actuates the base of transistor Q3 through a 33 ohm resistor R9 and 11 volt zener diode Z3. When open-circuit peaks exceed the order of 26 volts from the feedback winding 20, Q3 becomes conductive, in effect connecting the base and collector of Q2 to each other. Q2 then loads the transformer T2 substantially as a diode. The peaks of collector oscillations are held to the order of 400 volts and the collector current drawn during open-circuit is limited to about 0.3 ampere.

The ten turns in the lowest half 21 of T2 are included to increase the voltage swing across Q2 and thereby increase its loading effect.

Current limiting is not shown in FIG. 4, since its use normally is not necessary. It could be provided by connecting the winding 21 through a diode, resistance, and zener diode to the base of the control transistor Q3. Current peaks in the oscillator tend to produce voltage peaks in T2, which may then be suppressed by the transistor Q2, acting substantially as a diode load.

Figure 5:
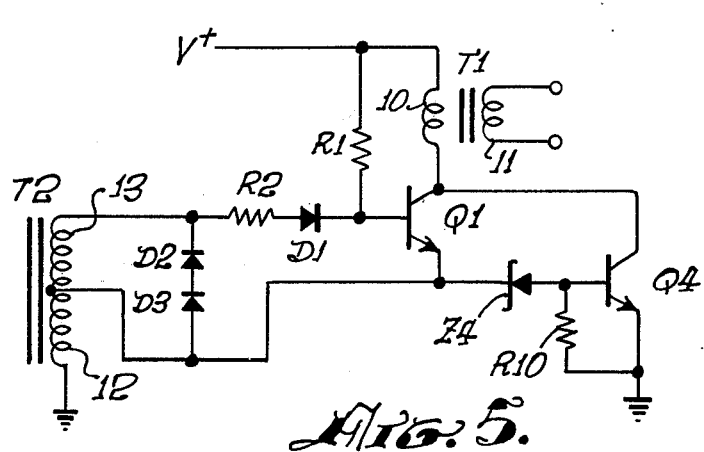
FIG. 5 is an electrical diagram of another embodiment of the invention with two transistors operating in parallel.
Figure 6:
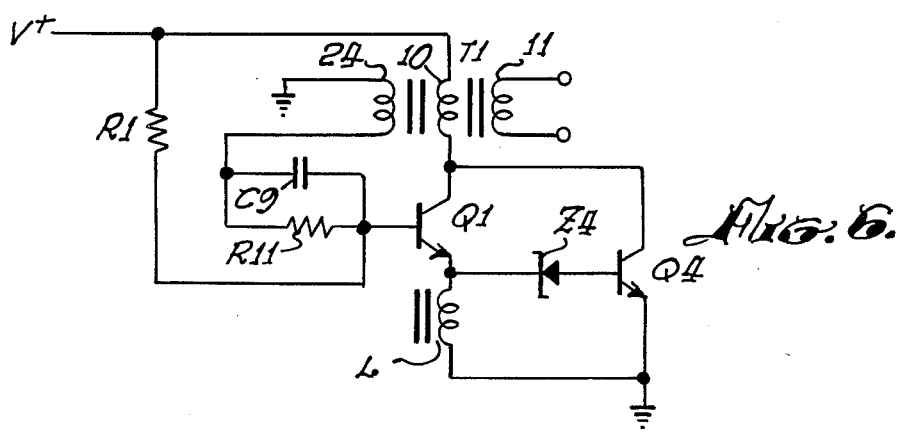
FIG. 6 is an electrical diagram of another embodiment of the invention with two power transistors in parallel.

Two alternative embodiments utilizing two power transistors in a complementary manner are shown in FIGS. 5 and 6. In the circuit of FIG. 5, transistor Q4 is connected between the primary winding 10 and circuit ground, with resistor R10 between the emitter and base of Q4 and with zener diode Z4 between the emitter of Q1 and base of Q4. The transistor Q4 conducts primarily during the start and end peaks which are of sufficient amplitude to pass current through the zener diode Z4. Transistor Q1 operates through the entire conduction cycle. The transistor Q4 serves to shorten the switching intervals and to assume a major portion of the transient switching load.

In the embodiment of FIG. 6, the transistor Q1 is connected in a conventional voltage feedback configuration with a feedback winding 24 connected to the base through resistor R11 and capacitor C9. An inductance L is connected in series with the primary winding 10 and the collector and emitter of Q1 across the dc input. The transistor Q4 is connected across the transistor Q1 and inductance L, with the zener diode Z4 between the base of Q4 and emitter of Q1. The base-to-emitter path of Q4 provides the ac emitter return path for Q1. Transistor Q1 functions as the basic oscillator and transistor Q4 is current controlled by Q1. The circuits of FIGS. 5 and 6 are preferable to the parallel operation of transistors in some installations, since in a parrallel configuration one transistor tends to take on more of the load than the other owing to unequal characteristics.

While exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a high frequency power supply system for supplying power to a gas discharge lamp load or the like, including inverter means connected across a pair of direct-current input terminal means, said inverter means including an oscillator circuit including a first transistor having base, emitter and collector electrodes, and a first transformer having primary and secondary windings; the improvement which comprises
   (a) a second transformer (T2) having first (12; 27) and second windings;
   (b) said first transistor (Q1) including an emitter-to-collector circuit connected in series with said primary winding (10) to define a series path which is connected across the input terminal means;
   (c) a starter resistor (R1) connected at one end with the base electrode of said first transistor, the other end of said starter resistor being connected with one end of said primary winding;
   (d) a second resistor (R2) and first diode means (D1) connected in series between one end of said second winding (13) and the base electrode of said first transistor, the other end of said second winding being connected with one of the emitter and collector electrodes of said first transistor;
   (e) second diode means (D2, D3) connected across said second winding, the polarities of said first and second diode means being such that when said second winding has alternate states of energization, said second winding is connected in series with, and isolated from, the circuit defined between the base electrode and one of the emitter and collector electrodes of said first transistor, respectively; and
   (f) means connecting said first winding (12; 27) in series with one (10; 11) of said primary and secondary windings of said first transformer (T1).

2. In a high frequency power supply system for supplying power to a gas discharge lamp load or the like, including inverter means connected across a pair of direct-current input terminal means, said inverter means including an oscillator circuit including a first transistor, having base, emitter and collector electrodes, and a first transformer having primary and secondary windings; the improvement which comprises
   (a) a second transformer having first (12) and second (13) windings joined at one end by a junction, said primary winding (10), the emitter-to-collector circuit of said first transistor, and said first winding being connected successively in series to define a series path connected across the direct-current input terminal means;
   (b) a starter resistor (R1) connected at one end with the base electrode of said first transistor, the other end of said starter resistor being connected with one end of said primary winding;
   (c) a second resistor (R2) and first diode means (D1) connected in series between the other end of said second winding and the base electrode of said first transistor; and
   (d) second diode means (D2, D3) connected across said second winding, the polarities of said first and second diode means being such that when said second winding has alternate states of energization, said second winding is connected in series with, and isolated from, the circuit between said base electrode and one of the collector and emitter electrodes of said first transistor, respectively.

3. Apparatus as defined in claim 2, and further including
   (e) a second transistor (Q2) having an emitter-to-collector circuit connected across the remote ends of said first (12) and second (13) windings, said second transistor also including a base electrode;
   (f) said first transformer including a feedback winding (20); and
   (g) first rectifier and voltage threshold circuit means (D4, R3, Z1) connecting one end of said feedback winding with the base electrode of said second transistor, the other end of said feedback winding being connected with one of the collector and emitter electrodes of said second transistor.

4. Apparatus as defined in claim 3, and further wherein
   (h) said second transformer includes a third winding (21) connected at one end with the end of said first winding (12) remote from said second winding; and (i) second rectifier and voltage threshold control means (D6, R4, Z2) connecting the other end of said third winding with the base electrode of said second transistor.

5. Apparatus as defined in claim 2, and further including
   (e) a second transistor (Q2) having an emitter-to-collector circuit connected between the remote ends of said first and second windings, said second transistor also including a base electrode;
   (f) said second transformer including a third winding (21) connected at one end with the remote end of one of said first and second windings; and
   (g) rectifier and voltage threshold control means (D6, R4, Z2) connecting the other end of said third winding with the base electrode of said second transistor.

6. Apparatus as defined in claim 2, and further including a second transistor (Q1a) including base, emitter, and collector electrodes connected with the base, emitter, and collector electrodes of said first transistor (Q1).

7. Apparatus as defined in claim 6, and further including a pair of resistors connecting the base electrodes of said first and second transistors, respectively, in series with said starter resistor (R1).

8. Apparatus as defined in claim 2, and further including
   (e) a second transistor (Q2) having an emitter-to-collector circuit connected between the remote ends of said first and second windings, said second transistor also having a base electrode;
   (f) a third transistor (Q3) having an emitter-to-collector circuit connected between the base electrode and one of said emitter and collector electrodes of said second transistor, said third transistor also having a base electrode;
   (g) said first transformer including a feedback winding (20); and
   (h) rectifier and voltage control means (D4, Z1, R8, R9, Z3) connecting one end of said feedback winding with the base electrode of one of said second and third transistors, the other end of said feedback winding being connected with the base electrode of the other of said second and third transistors.

9. Apparatus as defined in claim 8, wherein said rectifier and voltage control means further includes filter means.

10. Apparatus as defined in claim 8, wherein said second transformer further includes a third winding (21) connected at one end with the remote end of one of said first and second windings and connected at the other end with one of said collector and emitter electrodes of said second transistor.

11. Apparatus as defined in claim 2, and further including
    (e) a second transistor (Q4), and primary winding (10) and the emitter-to-collector circuit of said second transistor being connected to define a series path connected across the direct-current input terminal means;
    (f) voltage threshold control means (Z4) connecting the base electrode of said second transistor with said junction of said first (12) and second (13) windings; and
    (g) impedance means (R10) connecting the base electrode of said second transistor and one of said direct-current input terminal means.

12. In a high frequency power supply system for supplying power to a gas discharge lamp load or the like, including inverter means connected across a pair of direct-current input terminal means, said inverter means including an oscillator circuit including a first transistor having base, emitter and collector electrodes, and a first transformer having primary (10), secondary (11) and feedback (24) windings, said feedback winding being connected between said base electrode and one of said input terminal means;
the improvement which comprises
    (a) impedance means (L) connected in series with said primary winding and the emitter-to-collector circuit of said first transistor to define a series path connected across the direct-current input terminal means;
    (b) a second transistor (Q4) including an emitter-to-collector circuit connected in parallel across the series branch including said impedance means and the emitter to collector circuit of said first transistor, said second transistor including also a base electrode; and
    (c) voltage threshold control means (Z4) connecting the base electrode of said second transistor with the junction of said emitter-to-collector circuit of said first transistor and said impedance means.

13. Apparatus as defined in claim 12, wherein said impedance means comprises an inductance.

14. In a high frequency power source for a load such as gas discharge lamps, and having an inverter with oscillator circuit and first transformer, said first transformer having primary and secondary windings, said oscillator including a first transistor, the improvement comprising in combination:
    a second transformer having first and second windings, with said first winding connected in series with said secondary winding and lamps, and with said primary windings connected in series with said first transistor emitter and collector across a pair of dc input terminals;
    a starter resistor connected between the base of said transistor and one of said input terminals across said primary winding;
    a first diode and second resistor connceted in series between the base of said transistor and said second winding;
    second diode means; and
    means connecting said second diode means across said second winding.

15. A power source as defined in claim 14 wherein said second diode means includes two diodes connected in series.

* * * * *